United States Patent [19]
Belart

[11] 4,360,079
[45] Nov. 23, 1982

[54] SPOT-TYPE DISC BRAKE

[75] Inventor: Juan Belart, Walldorf, Fed. Rep. of Germany

[73] Assignee: ITT Industries, Inc., New York, N.Y.

[21] Appl. No.: 339,038

[22] Filed: Jan. 13, 1982

Related U.S. Application Data

[63] Continuation of Ser. No. 109,390, Jan. 3, 1980, abandoned.

[30] Foreign Application Priority Data

Feb. 3, 1979 [DE] Fed. Rep. of Germany ....... 2904118

[51] Int. Cl.³ .............................................. F16D 65/02
[52] U.S. Cl. ............................... 188/73.34; 188/73.36; 188/73.39; 188/73.43
[58] Field of Search .............. 188/73.33, 73.34, 73.36, 188/73.39, 73.43, 73.47

[56] References Cited

U.S. PATENT DOCUMENTS

| 3,590,961 | 7/1971 | Airheart | 188/73.34 |
|---|---|---|---|
| 3,592,301 | 7/1971 | Auth | 188/73.32 |
| 3,628,636 | 12/1971 | Beller et al. | 188/73.47 X |
| 4,003,453 | 1/1977 | Mathias | 188/73.34 |
| 4,061,209 | 12/1977 | Gee et al. | 188/73.45 |
| 4,072,215 | 2/1978 | Burgdorf et al. | 188/73.36 |
| 4,111,285 | 9/1978 | Honick | 188/73.34 |
| 4,136,761 | 1/1979 | Burgdorf et al. | 188/73.33 |

FOREIGN PATENT DOCUMENTS

| 1525377 | 10/1969 | Fed. Rep. of Germany . | |
| 2284800 | 4/1976 | France | 188/73.33 |
| 1433044 | 4/1976 | United Kingdom | 188/73.33 |

Primary Examiner—George E. A. Halvosa
Attorney, Agent, or Firm—John T. O'Halloran; Alfred C. Hill

[57] ABSTRACT

A floating caliper disc brake comprising a brake support with two arms projecting over the edge of the disc, a brake caliper extending between the arms and embracing the disc, and brake shoes arranged on opposite sides of the disc. The caliper is supported radially inwardly at the arms and the brake shoes are supported radially outwardly at the arms. The brake shoes and the caliper are connected to and maintained in their position at the arm of the brake support by a detachable holding arrangement.

13 Claims, 4 Drawing Figures

SPOT-TYPE DISC BRAKE

CROSS-REFERENCE TO RELATED APPLICATION

This is a continuation of application Ser. No. 109,390, filed Jan. 3, 1980, now abandoned.

BACKGROUND OF THE INVENTION

This invention relates to a spot-type disc brake, in particular for automotive vehicles, with a brake support member adjacent to a brake disc and having spaced surfaces arranged in the circumferential direction of the brake disc, the surfaces guiding at least a first brake shoe axially slidably thereat and supporting it in the circumferential direction with a brake caliper which embraces the periphery of the brake disc, the first brake shoe as well as a second brake shoe arranged on the other side of the brake disc is axially slidably guided and supported in the radial direction at guiding portions of the brake support member, and with a detachably holding means which connects the brake caliper to the brake support member and, following its detachment, enables the brake caliper to slide relative to the brake support member in the circumferential direction until it is disengaged from the guiding portions of the brake support member and ready for removal from the brake support member in a radial direction.

In a known spot-type disc brake of the aforementioned type (German Pat. No. DE-AS 1,525,377), the brake caliper is held and guided in an opening of the brake support member by spacers inserted on either side of the brake caliper between the brake caliper and the brake support member.

The spacers include a bridge extending approximately tangentially to the brake disc and located between lateral projections of the brake caliper and neighboring sections of the brake support member. Provided between the brake caliper and the brake support member is a leaf spring urging the brake caliper radially outwardly against the bridges of the spacers. In addition, the spacers have legs extending essentially radially and securing the brake caliper in a circumferential direction in its position relative to the brake support member. It is a disadvantage in this known brake that the axial slidability of the brake caliper may be impaired substantially by the entry of contaminants between the sliding surfaces of the caliper and the spacers and by the action of corrosion.

SUMMARY OF THE INVENTION

It is an object of the present invention to provide a spot-type disc brake of the type initially referred to which is of simple design and insensitive to contaminants and corrosion.

A feature of the present invention is the provision of a spot-type disc brake comprising a brake support member disposed adjacent a brake disc having spaced guiding portions disposed adjacent the circumference of and straddling the disc, the guiding portions slidably guiding at least a first brake shoe parallel to the axis of the disc, supporting the first brake shoe in a circumferential direction, slidably guiding a brake caliper embracing the disc parallel to the axis of the disc and supporting the brake caliper in a radial direction; and a detachable holding means to connect the caliper to the support member and, following its detachment to enable the brake caliper to slide relative to the support member in a circumferential direction until it is disengaged from the guiding portions enabling removal thereof from the support member in a radial direction, the holding means providing a positive engagement in the circumferential direction between the brake caliper and the first brake shoe.

By constructing the brake in accordance with the present invention, it is achieved that the supporting of the brake caliper in the circumferential direction on the guiding portions of the brake support member is exclusively effected by means that also serve to transmit the circumferential forces of the brake shoes to the brake support member. In this manner, the self-cleaning effect obtained at the guiding surfaces of the brake shoes as a result of the load applied on each braking operation also occurs at the brake caliper guide ensuring ease of slidability of brake shoes and brake caliper under all operating conditions. The holding means connecting one or both brake shoes with the brake support member can easily be designed in such a manner that it does not adversely affect the slidability of the brake shoe relative to the brake caliper.

The detachable holding means is preferably a bolt adapted to be fastened in the brake caliper and extending through an opening in the brake shoe. In this arrangement, the opening in the brake shoe is preferably an oblong hole whose longest axis extends essentially radially. Thereby only a line contact is established between the bolt and the brake shoe avoiding rusting-in and jamming of the bolt in the opening.

A particularly light-weight and space-saving design of the spot-type disc brake of this invention is achieved in that in the circumferential direction the brake caliper is directly supported at the brake support member in a plane remote from the first brake shoe in parallel with the brake disc, with the supporting surfaces being so designed that the brake caliper is pivotable about a radial axis. In this improvement of the invention, it will be an advantage if the second brake shoe is secured to and supported at the brake caliper.

In another proposal of this invention resulting in a particularly favorable design of the brake support member, the guiding portions of the brake support member extend radially outside the brake disc in parallel with the brake disc axis and have supporting surfaces for the brake caliper and the first or both brake shoes. Such a brake support member design allows ease of manufacture and simplifies maintenance of the disc brake because the brake support member need not be removed for disc brake replacement. Therefore, the brake is also suitable for applications in which the brake support member is integrally formed with the steering knuckle.

In a radial direction, the brake caliper preferably abuts surfaces of the guiding portions of the brake support member, which surfaces are close to the brake disc axis, while the first or both brake shoes abut surfaces remote from the brake disc axis. The arrangement prevents safely automatic disengagement of the brake caliper and ensures brake shoe replacement in a radial direction.

In a brake in which one brake shoe is supported at the brake support member via the brake caliper, it will be an advantage if the brake caliper leg associated with the first brake shoe is in abutment with the surfaces of the guiding portions of the brake support member, which surfaces are close to the brake disc axis, while the brake caliper leg associated with the second brake shoe is in abutment with surfaces remote from the brake disc axis.

In order to keep brake caliper and brake support member in mutual abutment and to avoid the occurrence of ratting noise, a spring is preferably provided clamping the brake caliper relative to the brake support member. It may be useful if the bolts provide a positive connection between the brake caliper and at least one brake shoe in a radial direction. Thereby the brake caliper is held in its position in the brake support member even in the event of the spring breaking.

In an advantageous embodiment of the brake caliper, its two legs have on the sides of the brake shoes remote from the brake disc projections extending in the circumferential direction and serving to guide the brake caliper at the guiding portions of the brake support member.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
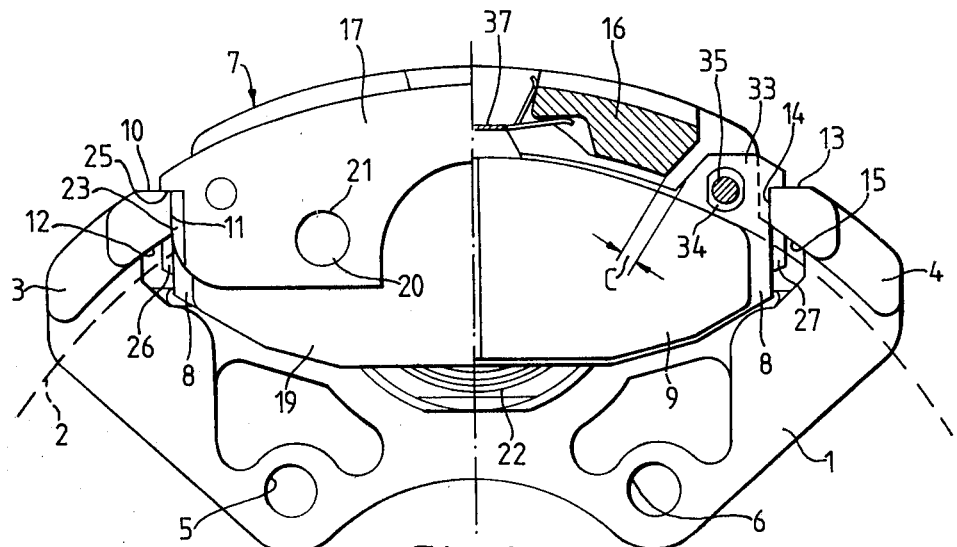
FIG. 1 is a side view partially cut away, of a spot-type disc brake in accordance with the principles of the present invention having two different brake shoes.
Figure 2:
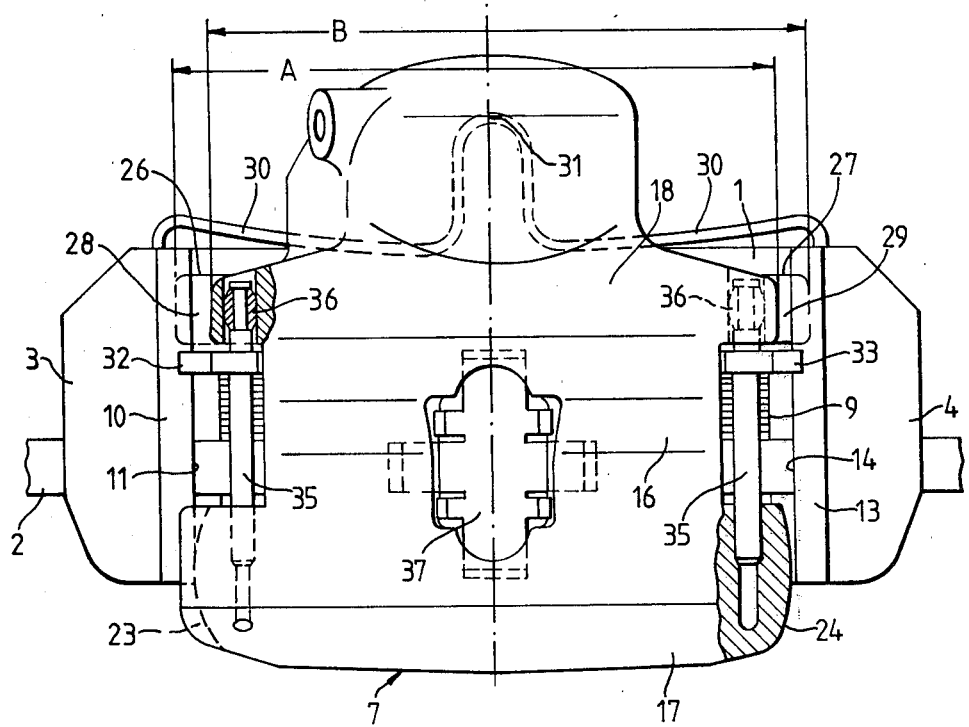
FIG. 2 is a top plan view of the spot-type disc brake of FIG. 1.

The spot-type disc brake illustrated in FIGS. 1 and 2 comprises a brake support member 1 extending laterally adjacent to a brake disc 2 and including guiding portions 3 and 4 embracing the periphery of brake disc 2. Bores 5 and 6 serve to fasten brake support member 1 to the steering knuckle of a vehicle. The confronting sides of guiding portions 3 and 4 have machined surfaces serving as a guide and support for a brake caliper 7 and the backing plate 8 of a brake shoe 9. Machined on guiding portion 3 are a surface 10 remote from the axis of rotation of brake disc 2, a radially aligned surface 11 and a surface 12 closer to the axis of rotation of brake disc 2 then surface 10. Machined on guiding portion 4 are a surface 13 remote from the axis of rotation of brake disc 2, a radially aligned surface 14 and a surface 15 closer to the axis of rotation of brake disc 2 than surface 13. Surfaces 10 and 13 lie in a common plane and are preferably made in one operation. Surfaces 11 and 14 are arranged parallel to each other and normal to surfaces 10 and 13. Surfaces 12 and 15 extend essentially tangentially to brake disc 2. All surfaces are parallel to the axis of rotation of brake disc 2.

Brake caliper 7 includes legs 17 and 18 arranged on opposite sides of brake disc 2 and connected by a bridge member 16. Leg 17 carries a brake shoe 19 with projections 20 which extend into bores 21 in brake caliper 7 for transmission of the brake torque. Leg 18 forms the cylinder of the hydraulic brake-actuating device whose piston 22 acts directly on backing plate 8. To guide and support brake caliper 7, leg 17 includes radially aligned surfaces 23 and 24 which are the sections of a common cylinder outer surface and are preferably manufactured by turning. Surface 23 abuts surface 11, and surface 24 abuts surface 14. Surfaces 23 and 24 have radially outwardly directed adjoining surfaces 25 with which brake caliper 7 rests on surfaces 10 and 13. Leg 18 has at its two ends projections 26 and 27 fitting underneath guiding portions 3 and 4 and having their surfaces 28 and 29 in abutment with surfaces 12 and 15. A spring 30 hinged in brake support member 1 grips under the cylinder of leg 18 and urges brake caliper 7 radially outwardly at position 31 whereby surfaces 25, 28 and 29 of brake caliper 7 are urged against guiding portions 3 and 4.

Backing plate 8 of brake shoe 9 has at its ends hook-shaped lugs 32 and 33 whose end surfaces are in abutment with surfaces 10, 11 and 13, 14, respectively, and transmit the braking torque to support member 1. Provided in lugs 32 and 33 are essentially radially aligned oblong holes 34 through which bolts 35 serving as holding means extend. Bolts 35 are received in bores in legs 17 and 18 and secured against axial displacement in leg 18 by frictional engagement obtained by clamping sleeves 36. Oblong holes 34 are so dimensioned that the clearance relative to bolts 35 is small in the circumferential direction while it is relatively large in the radial direction.

In order to ensure fitting and removal of brake caliper 7 and brake shoes 9 and 19 without unscrewing brake support member 1 from its mounting, a gap is provided between the ends of leg 18 and surfaces 11 and 14 of guiding portions 3 and 4 and the distances A and B between the one or the other end of leg 18 and the relevant opposite end of the projections 26 and 27 are smaller than the distance between surfaces 11 and 14. Moreover, between lugs 32 and 33 of backing plate 8 and bridge member 16, there is in the circumferential direction a clearance C which corresponds to, or is even greater than, the clearance between the ends of leg 18 and surfaces 11 and 14. Thus, leg 18 of brake caliper 7 is held in the circumferential direction only by bolts 35 and backing plate 8. When bolts 35 are urged out of the bores in brake caliper 7 by means of a tool and removed, leg 18 of brake caliper 7 can be displaced in the circumferential direction until one of the projections 26 and 27 is out of engagement with guiding portions 3 or 4. Then brake caliper 7 can be pivoted upwards about an axis parallel to the axis of disc 2 for removal from brake support member 1. It is then possible to replace brake shoes 9 and 19. Brake shoe 9 is pulled out of brake support member 1 in a radial direction. Brake shoe 19 is located in brake caliper 7 and is detached from its mounting by axial displacement in the direction of leg 18. Fitting the brake shoes and the brake caliper is logically in the reverse order.

In order to clamp brake shoes 9 and 19 in their mounting position relative to brake support member 1 and keep them from rattling, a cross-shaped hold-down spring 37 is fastened in a central opening of bridge member 16, with the spring leaf extending in the axial direction acting on the outer edges of brake shoes 9 and 19.

Figure 3:
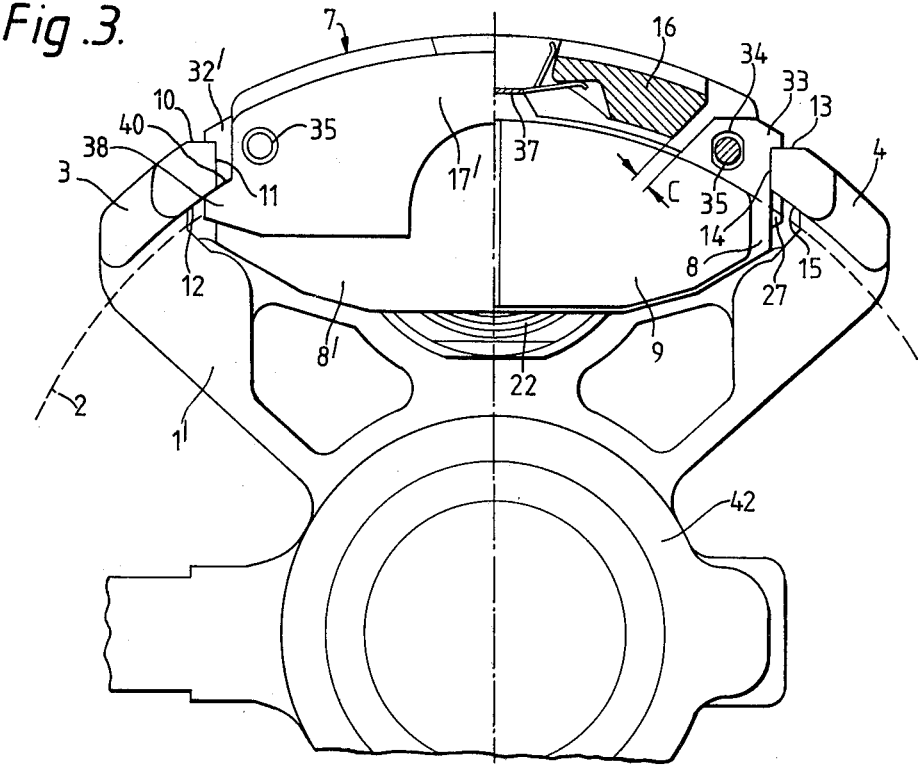
FIG. 3 is a side view, partially cut away, of a spot-type disc brake in accordance with the principles of the present invention having two identical brake shoes.
Figure 4:
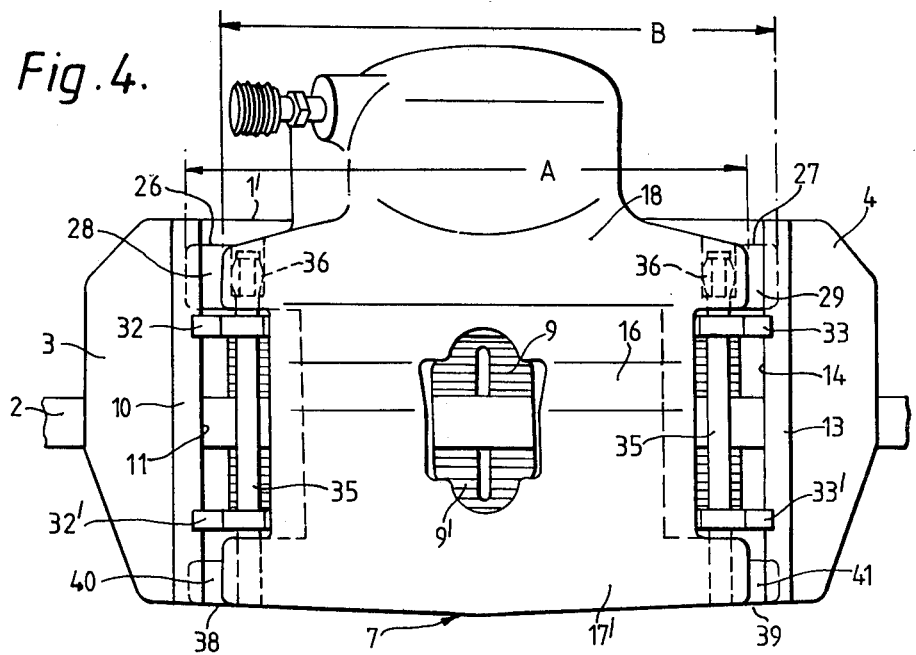
FIG. 4 is a top plan view of the spot-type disc brake of FIG. 3.

In so far as the components used in the embodiment illustrated in FIGS. 3 and 4 correspond to the components used in the embodiment of FIGS. 1 and 2 as regards their basic design and effect, like parts have been assigned like reference numerals. The second embodiment differs from the embodiment previously described essentially in that the two brake shoes 9 and 9' are similar in their outer dimensions and directly supported at guiding portions 3 and 4 of brake support member 1'. Brake support member 1' is not fastened by means of screw but integrally formed with the wheel carrier 42 of a vehicle. Leg 17' of brake caliper 7 is conformed to leg 18 and has at its two ends projections 38 and 39 fitting underneath guiding portions 3 and 4 and having their surfaces 40 and 41 remote from the axis of rotation of the brake disc in abutment with surfaces 12 and 15.

In this embodiment, the only function of spring 37 is to urge brake caliper 7 and brake shoes 9 and 9' against the surfaces of guiding portions 3 and 4 in a radial direction.

Should spring 37 break, the necessary holding together of the brake will be ensured by bolts 35 extending through the backing plates 8 and 8' of both brake shoes, and only a rattling noise will be heard. The other function of bolts 35 is to support brake caliper 7 at the two backing plates 8 and 8' in the circumferential direction.

In order to permit fitting and removal of brake caliper 7, in this embodiment the distance A between projections 26 and 38 and the opposite end of legs 18 and 17' and the distance B between projections 27 and 39 and the opposite end of legs 18 and 17' is smaller than the distance between surfaces 11 and 14, and the distance between lugs 32, 33 and 32', 33' and bridge member 16 corresponds to, or is greater than, the distance between the ends of legs 18 and 17' and surfaces 11 and 14. Therefore, on removal of bolts 35 brake caliper 7 can be displaced in the circumferential direction until the projections on the one side of caliper 7 are lifted off of guiding portion 3 or 4. Then caliper 7 can be pivoted upwards on this side and lifted off of brake support member 1 radially. Brake shoes 9 and 9' can then be removed likewise in the radial direction. Fitting the brake is logically in the reverse order.

Both embodiments are symmetrical with regard to the center line so that there is the option to fit the brake on the right- or left-hand side of a vehicle. For fitting and removing brake caliper 7, it is, however, sufficient if the necessary distance between the ends of legs 17, 18 or 17', 18 and guiding portions 3 and 4 is ensured on only one side of caliper 7 and if the projections arranged on the opposite side of caliper 7 terminate at the prescribed distance from these ends of the legs.

As the two embodiments clearly show, brake caliper 7 is in direct abutment with brake support member 1 at a few locations only and with relatively small contact areas. Abutment in the radial direction is ensured by a spring limiting the abutment force and preventing jamming as a result of particles of dirt or corrosion entering between the guiding surfaces. In the embodiment shown in FIGS. 3 and 4 there is no direct abutment of brake caliper 7 with brake support member 1' in the circumferential direction. Thus, it was possible to provide sufficient clearance at all positions so that slidability of brake caliper 7 cannot be impaired due to contamination and corrosion. The only place where contaminants and corrosion could adversely affect the slidability of the brake shoes is between the lugs of the backing plates and the neighboring surfaces of guiding portions 3 and 4. This is, however, avoided by dimensioning the size of the abutment surfaces such that the surface pressure occurring results in a self-cleaning effect of the abutment surfaces. The same applies basically to the embodiment illustrated in FIGS. 1 and 2. In this embodiment, at the place where brake caliper 7 is in direct abutment with guiding portions 3 and 4 of brake support member 1, the pressure caused by the torque of brake shoe 19 between surfaces 11, 23 and 14, 24 is of magnitude sufficient to achieve the self-cleaning effect on the surfaces.

While I have described above the principles of my invention in connection with specific apparatus it is to be clearly understood that this description is made only by way of example and not as a limitation to the scope of my invention as set forth in the objects thereof and in the accompanying claims.

What is claimed is:

1. A spot-type dic brake comprising:
    a brake support member disposed adjacent a brake disc having circumferentially spaced guiding portions disposed adjacent the circumference of and straddling said disc, said guiding portions slidably guiding at least a first brake shoe adjacent one side of said disc parallel to a rotational axis of said disc, supporting said first brake shoe in a circumferential direction, slidably guiding a brake caliper embracing said disc parallel to said axis and supporting said brake caliper in a radial direction, said caliper having at least a first leg adjacent said first brake shoe abutting each of said guiding portions only in a radially outward direction and said first brake shoe having portions abutting each of said guiding portions only in a radially inward direction; and
    detachable holding means extending between said first leg and a second leg of said caliper disposed on the opposite side of said disc from said first brake shoe and through said portions of said first brake shoe, said holding means, said first leg in its relationship with said guiding portions and said portions of said first brake shoe in its relationship with said guiding portions cooperating to connect said brake caliper to said support member prior to detachment of said holding means, the spacing between said circumferentially spaced guiding portions being constructed and arranged such that following only detachment of said holding means, said brake caliper may slide relative to said support member in a circumferential direction until it is disengaged from one of said guiding portions enabling removal thereof from said support member in a radial direction by pivoting around an axis parallel to said axis at the other of said guiding portions, said holding means providing a positive engagement in said circumferential direction between said brake caliper and said first brake shoe.

2. A brake according to claim 1, wherein said holding means includes
    a pair of bolts each fastened in said first and second legs of said brake caliper and extending through a different one of a pair of oblong holes each through a different one of said portions of said first brake shoe, each of said pair of holes having a larger dimension extending in a radial direction and a smaller dimension extending in a circumferential direction.

3. A brake according to claim 2, wherein said pair of bolts provide a positive engagement between said caliper and said first brake shoe in the radial direction.

4. A brake according to claims 1, 2, or 3, wherein said caliper includes:
    two supporting surfaces each engaging a different one of said guiding portions in substantially a radially extending line contained in a common plane parallel to said disc and remote from said first brake shoe to support said caliper relative to said support member in said circumferential direction, said two supporting surfaces being so formed that said caliper is pivotable about an axis parallel to said disc.

5. A brake according to claim 4, wherein
a second brake shoe disposed on the opposite side of said disc from said first brake shoe is secured to and supported by said second leg of said caliper.

6. A brake according to claim 5, wherein said caliper includes
said first leg associated with said first brake shoe has a first pair of projections each extending in an opposite circumferential direction and spaced from the side of said first brake shoe remote from said disc, and
said second leg associated with said second brake shoe has a second pair of projections each extending in an opposite circumferential direction and spaced from the side of said second brake shoe remote from said disc,
each of said first pair of projections and each of said second pair of projections slidably engaging a different one of said guide portions to guide said caliper.

7. A brake according to claim 4, wherein
each of said guiding portions extend radially outside the circumference of said disc and extend parallel to the axis of said disc, each of said guiding portions having supporting surfaces for said caliper and said first brake shoe.

8. A brake according to claim 7, wherein
a second brake shoe disposed on the opposite side of said disc from said first brake shoe engages said supporting surfaces.

9. A brake according to claim 7, wherein each of said supporting surfaces include
a first surface close to the axis of said disc against which said first leg of said caliper abuts in said radially outward direction, and
a second surface remote from the axis of said disc against which said first brake shoe abuts in said radially inward direction.

10. A brake according to claim 9, wherein
a second brake shoe disposed on the opposite side of said disc from said first brake shoe abuts against said second surface.

11. A brake according to claim 10, wherein
said second leg is in abutment with said second surface.

12. A brake according to claim 11, wherein
said caliper is clamped relative to said support member by a first spring engaging said caliper and said support member.

13. A brake according to claim 12, wherein
said first and second brake shoes are clamped in their position relative to said support member by a second spring engaging said caliper and both of said first and second brake shoes.

* * * * *